(12) United States Patent
Crowne (10) Patent No.: US 10,281,329 B2
(45) Date of Patent: May 7, 2019

(54) METHOD AND SYSTEM FOR FAST DETERMINATION OF THE WAVELENGTH OF A LIGHT BEAM

(71) Applicant: Simmonds Precision Products, Inc., Vergennes, VT (US)

(72) Inventor: David H. Crowne, Weybridge, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 0 days.

(21) Appl. No.: 15/623,137

(22) Filed: Jun. 14, 2017

(65) Prior Publication Data

US 2018/0364099 A1  Dec. 20, 2018

(51) Int. Cl.
*G01J 3/28* (2006.01)
(52) U.S. Cl.
CPC ........................ *G01J 3/28* (2013.01)
(58) Field of Classification Search
CPC .......................................................... G01J 3/28
USPC ........................................................ 356/402
See application file for complete search history.

(56) References Cited

U.S. PATENT DOCUMENTS

| | | | |
|---|---|---|---|
| 4,508,970 A * | 4/1985 | Ackerman | G01F 23/2928 117/15 |
| 5,266,792 A | 11/1993 | Crowne et al. | |
| 5,319,435 A | 7/1994 | Melle et al. | |
| 5,557,398 A * | 9/1996 | Wechsler | G01N 21/253 250/227.23 |
| 5,999,271 A * | 12/1999 | Shih | G01S 7/483 250/214 R |
| 6,276,933 B1 * | 8/2001 | Melnyk | A61C 19/10 356/402 |
| 7,203,212 B2 | 4/2007 | Brown | |
| 7,323,672 B2 | 1/2008 | Liang et al. | |
| 7,820,971 B2 | 10/2010 | Velicu et al. | |
| 8,035,183 B2 | 10/2011 | Bui et al. | |
| 10,012,541 B2 * | 7/2018 | Langner | G01J 3/0256 |
| 2003/0081214 A1 * | 5/2003 | Mestha | G01J 3/46 356/402 |
| 2010/0097609 A1 * | 4/2010 | Jaeger | G01J 1/4228 356/402 |
| 2014/0183362 A1 * | 7/2014 | Islam | G01J 3/453 250/338.4 |
| 2018/0180793 A1 * | 6/2018 | Fattal | G02C 7/04 |

* cited by examiner

*Primary Examiner* — Hina F Ayub
(74) *Attorney, Agent, or Firm* — Kinney & Lange, P.A.

(57) ABSTRACT

Apparatus and associated methods relate to determining the wavelength of a narrow-band light beam. Two portions of the narrow-band light beam are projected onto two dissimilar photodetectors, respectively. The two dissimilar photodetectors have dissimilar spectral responses over a domain of wavelengths that includes the wavelength of the narrow-band light beam. Each of the two dissimilar photodetectors generates an output signal indicative of a photocurrent induced by the projection of the portion of the narrow-band light beam thereon. A ratio of the differences between the photocurrents to the sum of the photocurrents of the two dissimilar photodetectors is determined. The determined ratio is a monotonic function of wavelength over the domain wavelengths including the wavelength of the narrow-band light beam. The determined ratio is thereby indicative of the wavelength of the narrow-band light beam.

20 Claims, 5 Drawing Sheets

METHOD AND SYSTEM FOR FAST DETERMINATION OF THE WAVELENGTH OF A LIGHT BEAM

BACKGROUND

Various physical parameters are monitored and/or measured during operation of an aircraft. Various methods of monitoring and/or measuring these physical parameters can be used. For example, sensors and/or transducers can measure position and/or relative locations of members of an aircraft. Some sensors and/or transducers can be affixed to an aircraft at specific locations so as to produce signals indicative of various physical phenomena experienced at those specific locations. These signals can then be transmitted to an analyzer that receives and interprets the signals. Some specific locations where it would be desirable to affix a sensor and/or transducer might be locations that have harsh environments. For example, some such locations might expose an affixed sensor to high temperatures, high pressures, high levels of exposure to electromagnetic interference, etc.

In many of these harsh environment locations, optical transducers have found use. Optical sensors and/or transducers can produce optical signals indicative of various physical phenomena. For example, optical sensors and/or transducers can produce optical signals indicative of stress, strain, temperature, tilt, rotation, vibration, pressure, etc. Various sensors and/or transducers employ various types of technologies. For example, some sensors use Fabry-Pérot Interferometry (FPI). Some sensors use Fiber Bragg Grating (FBG) technologies. Some sensors use intensity modulation techniques. Some sensors use various optical diffraction gratings to generate an output signal. Some of these technologies and techniques produce optical signals having a narrow-band spectrum or a specific wavelength that is indicative of the measured parameter. Spectrum analysis and/or spectral measurement of such signals can be performed to determine a measure of the physical phenomena indicated by the narrow-band spectrum or specific wavelength of the optical signal.

Photodetectors used in the determination of wavelength detection required precise temperature characterization. Such precise temperature characterization both increased the complexity of wavelength measurement systems and ultimately limited the fidelity of such systems. The fidelity of the spectral measurement can correlate to the precision and/or accuracy of the measured physical parameter. The frequency rate at which such spectral measurements can be performed can limit the frequency that measurements of such physical parameters can be provided. Thus, the present disclosure is directed to methods and systems for fast determination of the narrow-band spectrum or specific wavelength of such optical signals, thereby obtaining fast determination of the physical parameters measured by the various optical sensors.

SUMMARY

Apparatus and associated methods relate to a system for determining a wavelength of a narrow-band light beam. The system includes a first photodetector having a first spectral response over a domain of wavelengths including the wavelength of the narrow-band light beam. The first photodetector is configured to generate a first output signal $i_{d1}$ indicative of a first photocurrent induced by a projection of a first portion of the narrow-band light beam thereon. The system includes a second photodetector having a second spectral response over the domain of wavelengths including the wavelength of the narrow-band light beam. The second spectral response is different from the first spectral response. The second photodetector is configured to generate a second output signal $i_{d2}$ indicative of a second photocurrent induced by a projection of a second portion of the narrow-band light beam thereon. The system also includes a calculation engine configured to determine a ratio of the first and second photocurrents. The determined ratio is a monotonic function of wavelength over the domain of wavelengths including the wavelength of the narrow-band light beam, thereby indicative of the wavelength of the narrow-band light beam.

Some embodiments relate to a method for determining the wavelength of a narrow-band light beam. The method includes projecting a first portion of a narrow-band light beam onto a first photodetector having a first spectral response over a domain of wavelengths including the wavelength of the narrow-band light beam. Then, a first output signal $i_{d1}$ indicative of a first photocurrent induced by the projection of the first portion of the narrow-band light beam thereon is generated in response to the projection of a first portion of the narrow-band light beam thereon. Then, a second portion of a narrow-band light beam is projected onto a second photodetector having a second spectral response over the domain of wavelengths including the wavelength of the narrow-band light beam. The second spectral response is different from the first spectral response. Then, a second output signal $i_{d2}$ indicative of a second photocurrent induced by the projection of the second portion of the narrow-band light beam thereon is generated in response to projection of a second portion of the narrow-band light beam thereon. Then, a ratio of the first and second photocurrents is determined. The determined ratio is a monotonic function of wavelength over the domain of wavelengths including the wavelength of the narrow-band light beam, thereby indicative of the wavelength of the narrow-band light beam.

DETAILED DESCRIPTION

Apparatus and associated methods relate to determining the wavelength of a narrow-band light beam. Two portions of the narrow-band light beam are projected onto two dissimilar photodetectors, respectively. The two dissimilar photodetectors have dissimilar spectral responses over a domain of wavelengths that includes the wavelength of the narrow-band light beam. Each of the two dissimilar photodetectors generates an output signal indicative of a photocurrent induced by the projection of the portion of the narrow-band light beam thereon. A ratio of the differences between the photocurrents to the sum of the photocurrents of the two dissimilar photodetectors is determined. The determined ratio is a monotonic function of wavelength over the domain wavelengths including the wavelength of the narrow-band light beam. The determined ratio is thereby indicative of the wavelength of the narrow-band light beam.

Figure 1:
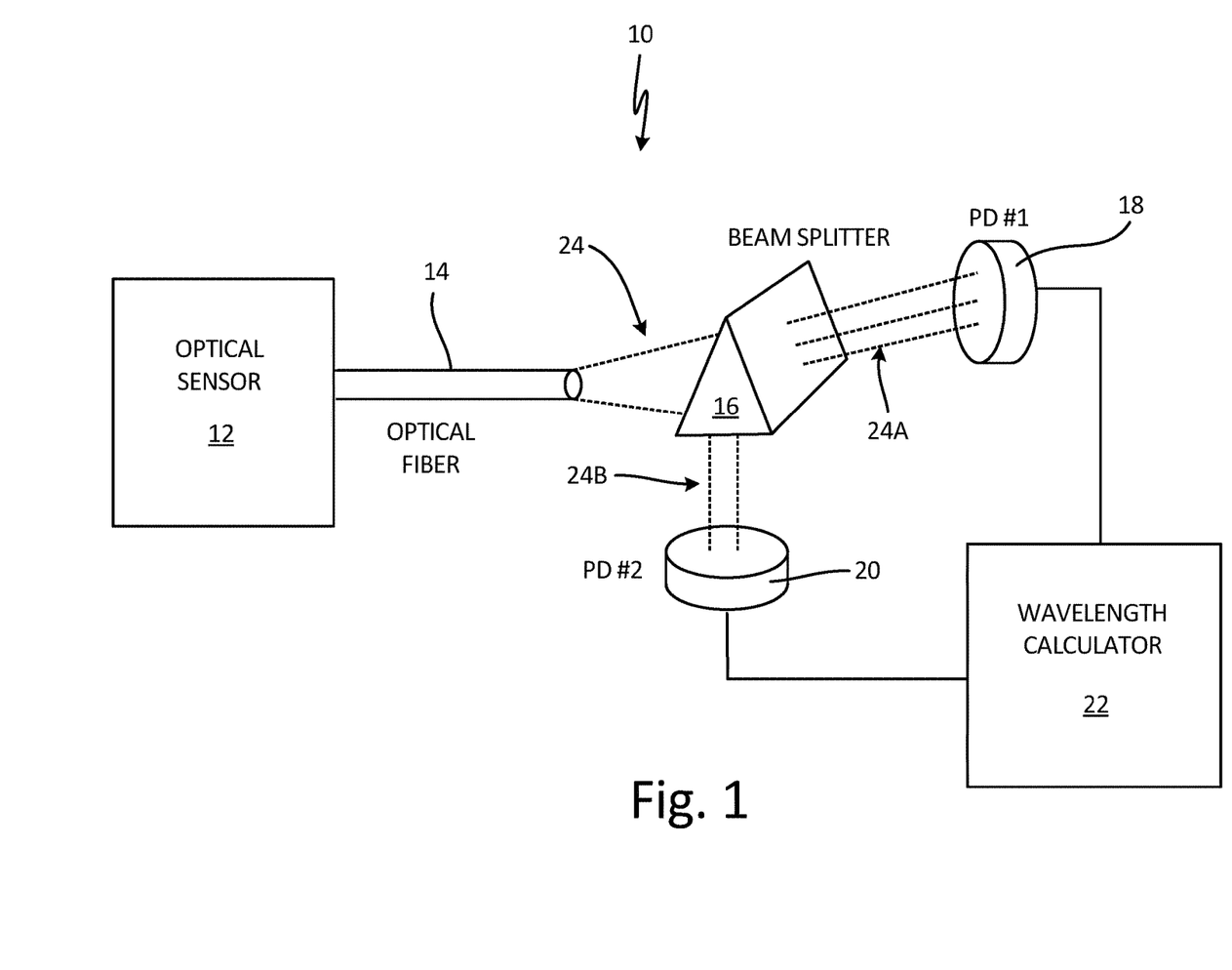
FIG. 1 is a schematic diagram of an embodiment of a system for sensing a physical parameter using fast determination of wavelength of a narrow-band beam of light.

FIG. 1 is a schematic diagram of an embodiment of a system for sensing a physical parameter using fast determination of wavelength of a narrow-band beam of light. In FIG. 1, optical sensing system 10 includes optical sensor 12, optical fiber 14, beam splitter 16, first photodetector 18, second photodetector 20, and calculation engine 22. Optical sensor 12 generates optical signal 24 that has a characteristic wavelength indicative of a value of a sensed physical parameter. Optical signal 24 is transmitted from optical sensor 12 via optical fiber 14 to beam splitter 16. Beam splitter 16 splits optical signal 24 into two portions 24A and 24B. First portion 24A of optical signal 24 is projected onto first photodetector 18. Second portion 24B of optical signal 24 is projected onto second photodetector 20. First and second photodetectors 18 and 20 have dissimilar spectral responses, one to another, over a domain of wavelengths that includes the characteristic wavelength of optical signal 24. Thus, even if beam splitter 16 splits optical signal 24 into two portions 24A and 24B having equal amplitudes and spectral compositions, the spectral responses thereto of photodetectors 18 and 20 can be different, one from another.

First and second photodetectors 18 and 20 generate output signals indicative of first and second photocurrents induced by portions 24A and 24B, respectively, of optical signal 24 projected thereon. Calculation engine 22 receives the output signals generated by first and second photodetectors 18 and 20 and calculates both a sum and a difference of the first and second photocurrents indicated by the output signals generated by first and second photodetectors 18 and 20, respectively. Calculation engine 22 then determines a ratio of the calculated difference of the first and second photocurrents to the calculated sum of the first and second photocurrents indicated by the output signals generated by first and second photodetectors 18 and 20, respectively.

This determined ratio is a monotonic function of wavelength over the domain of wavelengths that includes the wavelength of optical signal 24, if first and second photodetectors 18 and 20 are selected to have appropriate spectral responses. For example, if the spectral response of first photodetector 18 is monotonically increasing throughout the domain of wavelengths while the spectral response of second photodetector 20 is monotonically decreasing throughout the domain of wavelengths, then the ratio of the difference to the sum of photocurrents will also be a monotonic function of wavelength. Other less stringent spectral responses of first and second photodetectors 18 and 20 can also result in monotonicity of the ratio of the difference to the sum of photocurrents with respect to wavelength. The determined ratio of the difference to the sum of first and second photocurrents is indicative of the characteristic wavelength of optical signal 24.

Various optical sensors produce optical signals having narrow-band optical spectra or specific wavelengths that are indicative of the sensed parameters. Some optical sensors 12 backscatter a narrow-band portion of an incident optical signal. The backscattered narrow-band portion can have a characteristic wavelength that is indicative of a sensed parameter. Some such optical sensors include Fiber Bragg Gratings (FBGs), and Fabry Perot Interferometers (FPIs). Some optical sensors direct a diffracted portion of an incident optical beam into an optical fiber and/or onto a detector, thereby selecting a specific wavelength and/or narrow-band of wavelengths as an optical signal indicative of a sensed parameter. For example, a diffraction grating having a slowly-varying spatial frequency can be used as a linear position sensor. The diffraction grating can be linearly positioned in an optical signal path, thereby diffracting the optical signal. The diffraction of the optical signal varies depending on the spatial grating frequency at the location where the optical signal is incident. Various other optical sensors can also generate optical signals having a characteristic wavelength that is indicative of a value of a sensed parameter. The characteristic wavelength is indicative of the specific wavelength and/or the narrow-band of wavelengths corresponding to the optical signal. Because the optical signals generated by such optical sensors have a specific wavelength and/or the narrow-band of wavelengths, herein such sensor-generated optical signals are called narrow-band light beams.

In some embodiments, instead of using a beam splitter, optical signal 24 can be split into spectral components in other manners. For example, first photodetector 18 can be manufactured and/or positioned directly above second photodetector 20. First photodetector 18 then acts both as a detector and as a filter. First photodetector 18 acts as a detector by absorbing such portion of incident optical signal 24 and generating a signal indicative of the absorbed portion. First photodetector 18 transmits the complementary unabsorbed portion therethrough so that the transmitted portion not absorbed by first photodetector is incident upon underlying second photodetector 20. In such an embodiment, first photodetector 18 has a first spectral response, wherein the portion of optical signal 24 corresponds to wavelengths to which first photodetector is sensitive. Second photodetector 20 has a second spectral response, so as to absorb light transmitted through first photodetector 20. Such transmitted light has wavelengths to which first photodetector 18 is not sensitive.

Figure 2:
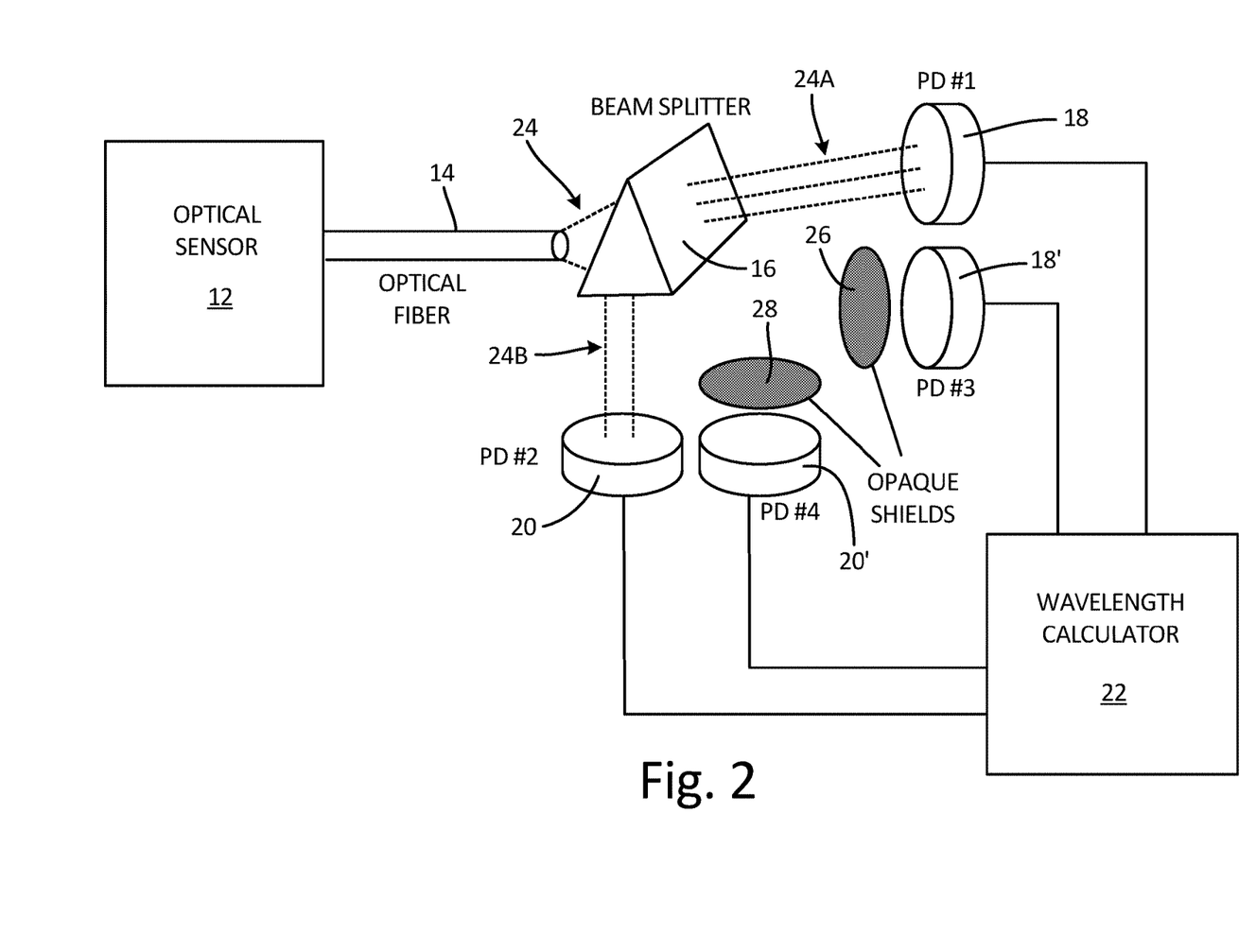
FIG. 2 is a schematic diagram of an embodiment of a system having reference photodetectors for sensing a physical parameter using fast determination of wavelength of a narrow-band beam of light.

FIG. 2 is a schematic diagram of an embodiment of a system having reference photodetectors for sensing a physical parameter using fast determination of wavelength of a narrow-band beam of light. In FIG. 2, optical sensing system 10' includes all the components of optical sensing system 10 depicted in FIG. 1, including: optical sensor 12, optical fiber 14, beam splitter 16, first photodetector 18, second photodetector 20, and calculation engine 22. In addition to the FIG. 1 disclosed components, optical system 10' includes two additional photodetectors 18' and 20' and opaque shields 26 and 28. Third photodetector 18' has substantially the same spectral response as the spectral response of first photodetector 18. Fourth photodetector 20' has substantially the same spectral response as the spectral response of second photodetector 20.

The purpose of third and fourth photodetectors 18' and 20' is to generate signals indicative of dark currents generated by first and second photodetectors 18 and 20. These dark currents are the current generated by a photodetector when no light is incident thereon. Opaque shields 26 and 28 are configured to shield third and fourth photodetectors 18' and 20' from incident light. In some embodiments, dark current responses of photodetectors can be a function of ambient temperature. Thus, it can be desirable, when using such temperature dependent photodetectors to locate first and third photodetectors 18 and 18' next to one another or exposed to the same temperature environment and to locate second and fourth photodetectors 20 and 20' next to one another or exposed to the same temperature environment. By doing so, third and fourth photodetectors 18' and 20' can experience substantially the same ambient temperatures as first and second photodetectors 18 and 20, respectively. Third photodetector 18' is thereby configured to generate a reference signal indicative of the dark current generated by first photodetector 18. Similarly, fourth photodetector 20' is thereby configured to generate a reference signal indicative of the dark current generated by second photodetector 20. By using third and fourth photodetectors 18' and 20' in this way, much of the deleterious temperature sensitivity of photodetectors 18 and 20 can be compensated without requiring complete spectral response curve be created for the photodetectors 18 and 20 for every anticipated ambient temperature.

In the FIG. 2 embodiment, calculation engine 22 receives the output signals generated by first and second photodetectors 18 and 20 as well as the reference signals generated by third and fourth photodetectors 18' and 20'. Calculation engine 22 then calculates the sum and difference of the photocurrents indicated by the output signals generated by first and second photodetectors 18 and 20. In some embodiments, such photocurrents can be computed by subtracting the reference currents generated by third and fourth photodetectors 18' and 20' from the output signals generated by first and second photodetectors 18 and 20, respectively. Calculation engine 22 then determines a ratio of the calculated difference of the computed photocurrents to the calculated sum of the computed photocurrents indicated by the output signals generated by first and second photodetectors 18 and 20.

Figure 3:
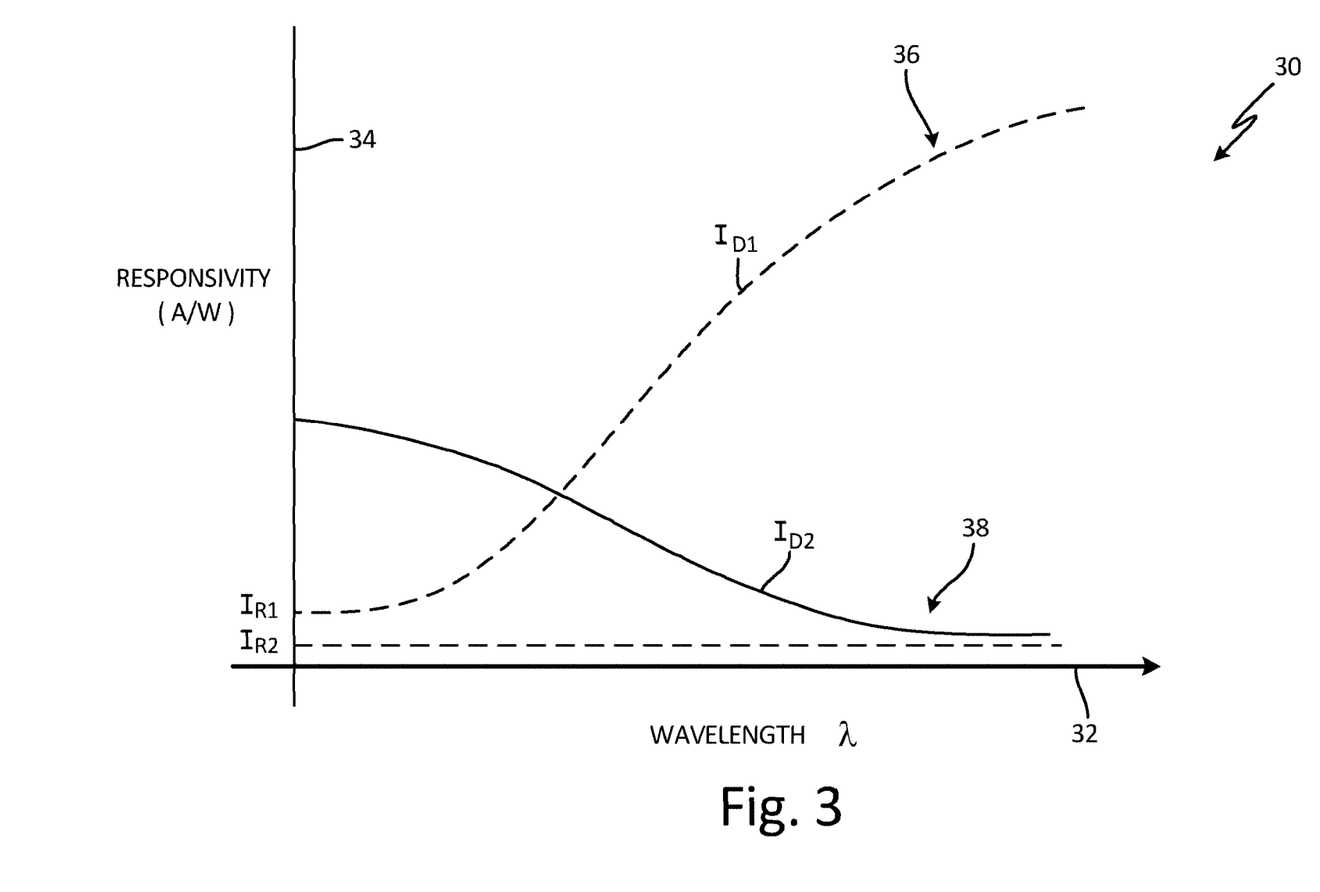
FIG. 3 is a graph of spectral responsivities of two dissimilar photodetectors for use in fast determination of wavelength of a narrow-band beam of light.

FIG. 3 is a graph of spectral responsivities of two dissimilar photodetectors for use in fast determination of wavelength of a narrow-band beam of light. In FIG. 3, graph 30 includes horizontal axis 32, vertical axis 34 and photodetector spectral response curves 36 and 38. Horizontal axis 32 is indicative of optical wavelength ($\lambda$). Vertical axis 34 is indicative of optical responsivity (A/W). First spectral response curve 36 is an exemplary spectral response of first photodetector 18 (and third photodetector 18', if used). Second spectral response curve 38 is an exemplary spectral response of second photodetector 20 (and fourth photodetector 20', if used). Spectral response curves 36 and 38 are depicted as being dissimilar, one to another.

First spectral response curve 36 monotonically increases from first minimum value as wavelength $\lambda$ increases. Conversely, second spectral response curve 38 monotonically decreases to second minimum value $i_{r2}$ as wavelength $\lambda$ increases. Each of the minima $i_{r1}$ and $i_{r2}$ of spectral response curves 36 and 38 correspond to the dark current of first and second photodetectors 18 and 20 (and 18' and 20', if used), respectively. Each of spectral response curves 36 and 38 has a photocurrent component and a dark-current component. Each of first and second photodetectors 18 and 20 generate an output signal $i_{d1}$ and $i_{d2}$ that has a both a photocurrent component and a dark-current component. Such an output current can be mathematically modeled as:

$$i_{diode} = i_{photocurrent} + i_{dark}. \quad (1)$$

In this equation, $i_{dark}$ corresponds to the minimum currents $i_{r1}$ and $i_{r2}$ and $i_{diode}$ corresponds to the output signals $i_{d1}$ and $i_{d2}$ of spectral response curves 36 and 38.

The photocurrent components of spectral response curves 36 and 38 are the portions of the spectral response curves 36 and 38 above the dark-current minima $i_{r1}$ and $i_{r2}$, respectively. The photocurrent components can be mathematically represented as:

$$i_{photocurrent} = i_{diode} - i_{dark}. \quad (2)$$

In some embodiments, the dark-current component of the spectral response curve can be quite small. In such embodiments, the photocurrent $i_{photocurrent}$ is approximately equal to the diode current $i_{diode}$. The diode current $i_{diode}$, in these embodiments, can be used as corresponding to the photocurrent $i_{photocurrent}$ and as indicative of the portion 24A or 24B of the narrow-band light beam 24 incident thereon, as shown in FIG. 1, for example.

In other embodiments, however, the dark-current component can be significant. In such embodiments, a reference photodetector, such as third and fourth photodiodes 18' and 20' shown in FIG. 2, can be used to measure the dark current $i_{dark}$. For such reference photodetectors to make representative measurements of the dark-currents $i_{dark}$ of corresponding sensing photodetectors (such as first and second photodetectors 18 and 20), both the reference photodetectors and the sensing photodetectors should be substantially identical (e.g., the same models, exposed to the same temperatures, etc.). Such reference photodetectors can be shielded from incident light so that the output signals generated thereby are indicative of only the dark-current components, and not of photocurrents induced by incident light. In such embodiments, the photocurrents can be calculated by taking the difference between the output signals of the respective sensing photodetectors and reference photodetectors.

Figure 4:
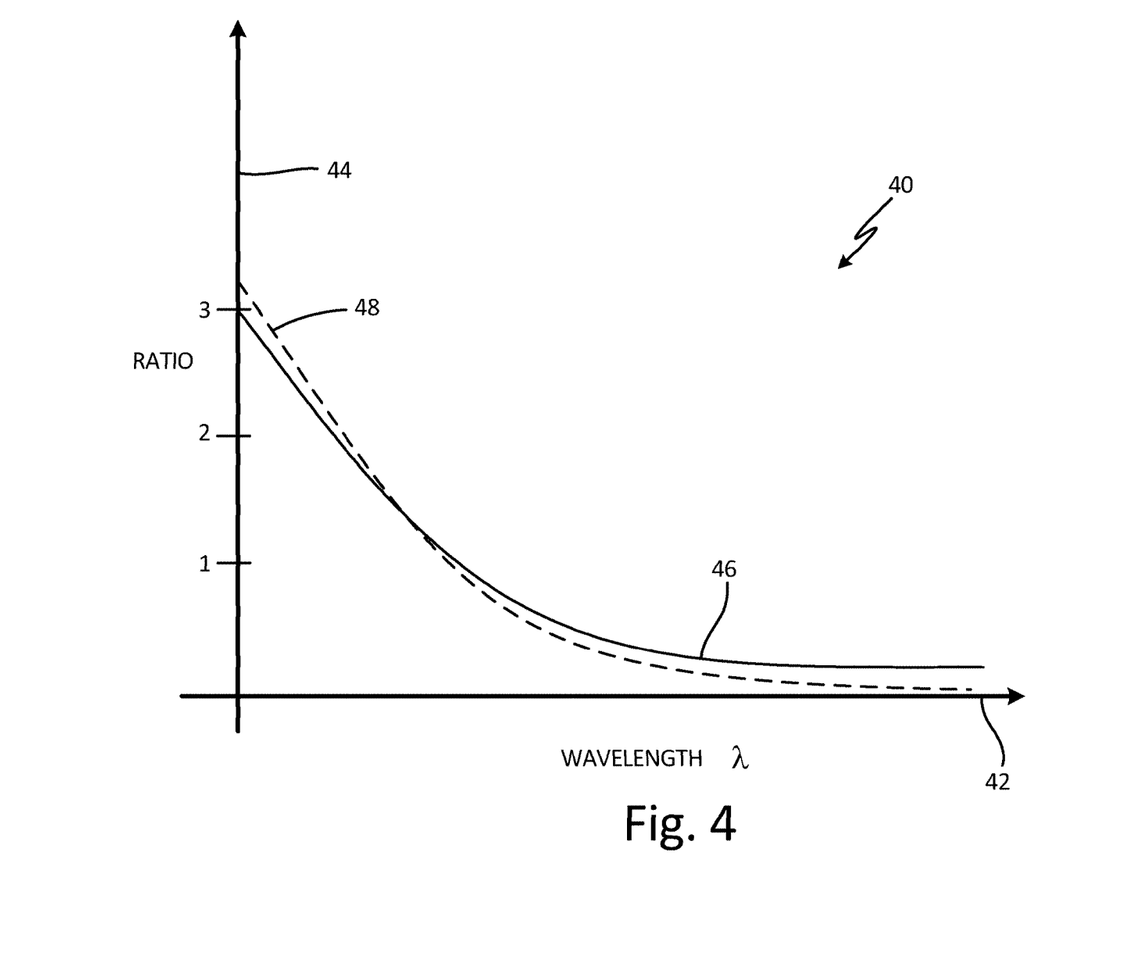
FIG. 4 is a graph of the determined ratio of the sum and difference of photocurrents generated by two dissimilar photodetectors.

FIG. 4 is a graph of the determined ratio of the sum and difference of photocurrents generated by two dissimilar photodetectors. In FIG. 4, graph 40 includes horizontal axis 42, vertical axis 44 and ratio relations 46 and 48. Horizontal axis 42 is indicative of optical wavelength k. Vertical axis 44 is indicative of a dimensionless ratio of the sum and the difference of two photocurrents generated by two dissimilar photodetectors. First ratio 46 represents the ratio of the difference to the sum of the output signals or diode currents $i_{d1}$ and $i_{d2}$ as depicted in FIG. 3. Such a ratio is approximately equal to the ratio of the difference and the sum of two photocurrents, if the dark-currents can be approximated to be zero. First ratio 46 can be mathematically represented as:

$$R = \frac{i_{d1} - i_{d2}}{i_{d1} + i_{d2}}. \quad (3)$$

Such an approximate ratio of photocurrents can be used in the exemplary embodiment depicted in FIG. 1, for example.

Second ratio 48 represents the ratio of difference to the sum of the calculated photocurrent components $i_{pc1}$ and $i_{pc2}$, for example using equation (2), of output signals or diode currents $i_{d1}$ and $i_{d2}$ as depicted in FIG. 3. Second ratio 46 can be mathematically represented as:

$$R = \frac{(i_{d1} - i_{r1}) - (i_{d2} - i_{r2})}{(i_{d1} - i_{r1}) + (i_{d2} - i_{r2})}. \quad (4)$$

Such an approximate ratio of photocurrents can be used in the exemplary embodiment depicted in FIG. 2, for example.

Figure 5:
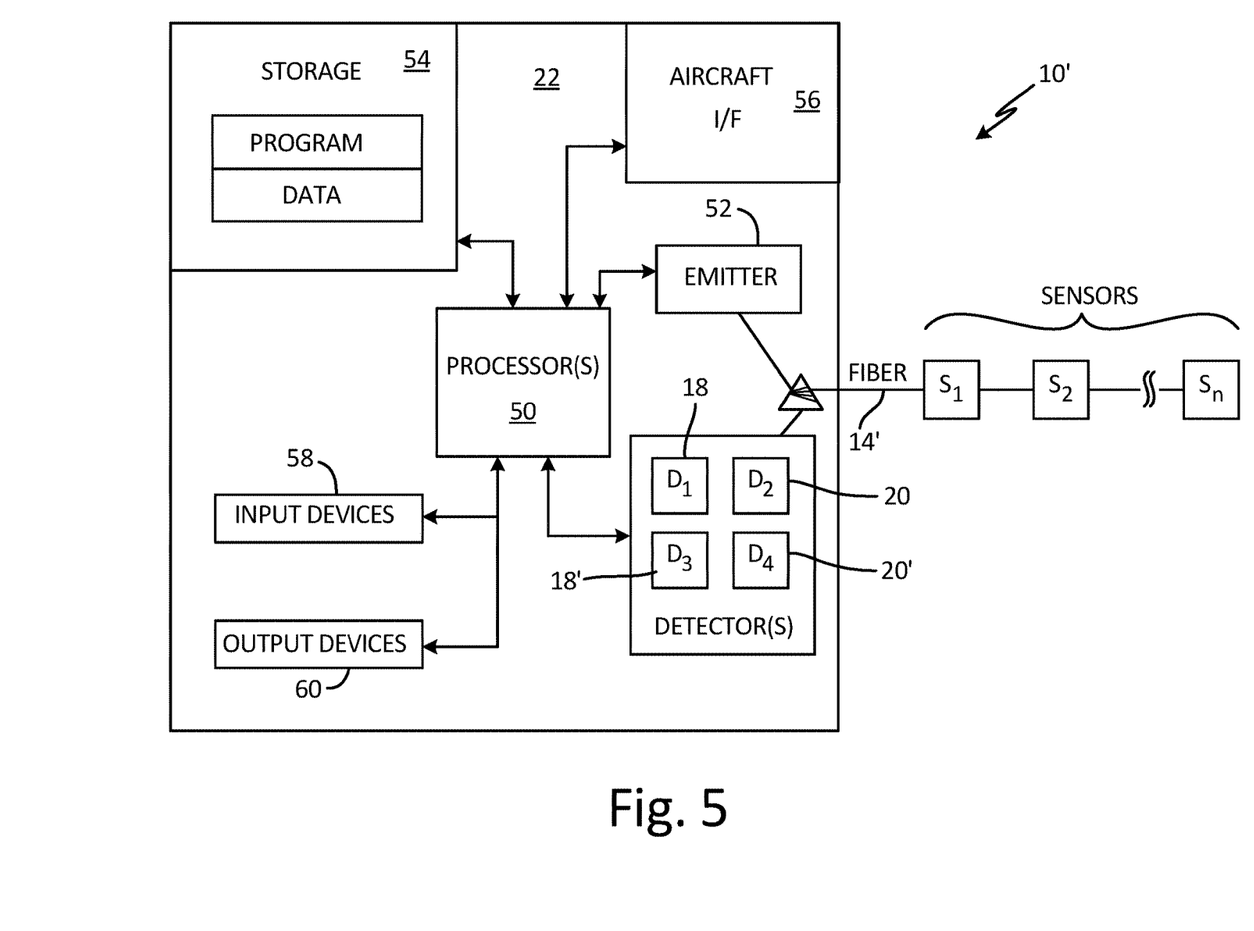
FIG. 5 is a block diagram of an exemplary system for determining the wavelength of a narrow-band beam of light.

FIG. 5 is a block diagram of an exemplary system for determining the wavelength of a narrow-band beam of light. In FIG. 5, optical sensing system 10' includes calculation engine 22, optical fiber network 14' and sensors $S_1$-$S_N$. Sensors $S_1$-$S_N$ are located at various specific locations along optical fiber network 14'. Each of sensors $S_1$-$S_N$ can be external to optical fiber network 14' or can be formed within optical fiber network 14'. Each of sensors $S_1$-$S_N$ can generate and/or affect an optical signal in response to a physical parameter.

Calculation engine 22 includes processor(s) 50, optical emitter 52, optical detectors 18, 18', 20 and 20', storage device(s) 54, aircraft interface 56, input devices 58 and output devices 60. Processor(s) 50 can receive program instructions 84P from storage device(s) 54. Processor(s) 50 can be configured to control HUMS 12, based on received program instructions 84P. For example processor(s) 50 can be configured to cause optical emitter 52 to generate a light beam. The generated light beam is directed into optical fiber network 14' where it is transmitted to sensors $S_1$-$S_N$. Optical sensors $S_1$-$S_N$ can be configured to generate a narrow-band optical signal in response to the transmitted light beam. For example, one or more of the sensors $S_1$-$S_N$ can be a fiber Bragg grating. The fiber Bragg grating can generate reflect a narrow-band portion of the transmitted light beam. The reflected narrow-band portion of the reflected light beam can have a wavelength $\lambda$ that is indicative of a physical parameter. One or more of the sensors $S_1$-$S_N$ can be a Fabry Perot interferometer, for example. Each of the Fabry Pérot interferometers can generate a narrow-band light signal and transmit it to optical fiber network 14'.

In some embodiments, sensors $S_1$-$S_N$ can be fiber Bragg gratings having different spatial frequencies $\lambda_1$-$\lambda_N$, respectively, from one another. By using fiber Bragg gratings that have non-overlapping wavelengths of sensitivity, each of sensors $S_1$-$S_N$ can by optically coupled along a single optical fiber. In other embodiments, each multiple optical fibers can be used to optically transmit optical signals of sensors $S_1$-$S_N$. The optical signals from the multiple fibers can be merged and projected upon first and second photodetectors 18 and 20.

Optical detectors 18 and 20 can detect the narrow-band light beams generated by sensors $S_1$-$S_N$. The timing at which the narrow-band light beams (relative to the transmitted light beam or some other timing metric) generated by sensors $S_1$-$S_N$ are received by optical emitter/detector module can be indicative of the specific sensor of sensors $S_1$-$S_N$ that generated the received narrow-band light beams. In some embodiments, optical detectors 18' and 20' can generate a signal indicative of dark currents of optical detectors 18 and 20, respectively.

Processor(s) 50 receives, from optical detectors 18, 18', 20 and 20', output signals indicative of photocurrents induced by the narrow-band light beams generated by sensors $S_1$-$S_N$ and the dark-currents associated with optical detectors 18, 18', 20 and 20'. Processor(s) 50 can then determine the wavelength $\lambda_1$-$\lambda_N$ of the received narrow-band light beams. The detected wavelengths $\lambda_1$-$\lambda_N$ can be indicative of physical parameters sensed by sensors $S_1$-$S_N$, respectively. In some embodiments, processor(s) 50 determines the wavelength $\lambda_1$-$\lambda_N$ based on a ratio of the sum and difference of the photocurrents as described above.

Processor(s) 50 can associate the determined wavelength $\lambda_1$-$\lambda_N$ with physical parameter values corresponding to those sensed by the sensors $S_1$-$S_N$. Processor(s) 50 can compare the associated parameter values with predetermined thresholds to determine if the sensed parameter values fall within a normal and/or expected range of values. If, for example, one or more of the associated parameter values does not fall within the expected range of values, processor(s) 50 can generate an alert signal and send the generated alert signal to aircraft interface 56. In some embodiments, processor(s) 50 can store and/or log the associated parameter values in data memory 84D. In some embodiments, processor(s) 50 may interface with other input and output devices 58 and 60.

As illustrated in FIG. 5, calculation engine 22 includes processor(s) 50, optical emitter 52, optical detectors 18, 18', 20 and 20', storage device(s) 54, aircraft interface 56, user input devices 58, and user output devices 60. However, in certain examples, calculation engine 22 can include more or fewer components. For instance, in examples where calculation engine 22 is an avionics unit, calculation engine 22 may not include user input devices 58 and/or user output devices 60. In some examples, such as where calculation engine 22 is a mobile or portable device such as a laptop computer, calculation engine 22 may include additional components such as a battery that provides power to components of calculation engine 22 during operation.

Processor(s) 50, in one example, is configured to implement functionality and/or process instructions for execution within calculation engine 22. For instance, processor(s) 50 can be capable of processing instructions stored in storage device(s) 54. Examples of processor(s) 50 can include any one or more of a microprocessor, a controller, a digital signal processor(s) (DSP), an application specific integrated circuit (ASIC), a field-programmable gate array (FPGA), or other equivalent discrete or integrated logic circuitry.

Storage device(s) 54 can be configured to store information within calculation engine 22 during operation. Storage device(s) 54, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 54 is a temporary memory, meaning that a primary purpose of storage device(s) 54 is not long-term storage. Storage device(s) 54, in some examples, is described as volatile memory, meaning that storage device(s) 54 do not maintain stored contents when power to calculation engine 22 is turned off. Examples of volatile memories can include random access memories (RAM), dynamic random access memories (DRAM), static random access memories (SRAM), and other forms of volatile memories. In some examples, storage device(s) 54 is used to store program instructions for execution by processor(s) 50. Storage device (s) 54, in one example, is used by software or applications running on calculation engine 22 (e.g., a software program implementing long-range cloud conditions detection) to temporarily store information during program execution.

Storage device(s) 54, in some examples, can also include one or more computer-readable storage media. Storage device(s) 54 can be configured to store larger amounts of information than volatile memory. Storage device(s) 54 can further be configured for long-term storage of information. In some examples, storage device(s) 54 include non-volatile storage elements. Examples of such non-volatile storage elements can include magnetic hard discs, optical discs, flash memories, or forms of electrically programmable memories (EPROM) or electrically erasable and programmable (EEPROM) memories.

Optical emitter 52, in some examples, includes a communications module. Optical emitter 52, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB).

Aircraft interface 56 can be used to communicate information between calculation engine 22 and an aircraft. In some embodiments, such information can include aircraft conditions, flying conditions, and/or atmospheric conditions. In some embodiments, such information can include data processed by calculation engine 22, such as, for example, alert signals. Aircraft interface 56 can also include a communications module. Aircraft interface 56, in one example, utilizes the communications module to communicate with external devices via one or more networks, such as one or more wireless or wired networks or both. The communications module can be a network interface card, such as an Ethernet card, an optical transceiver, a radio frequency transceiver, or any other type of device that can send and receive information. Other examples of such network interfaces can include Bluetooth, 3G, 4G, and Wi-Fi 33 radio computing devices as well as Universal Serial Bus (USB). In some embodiments, communication with the aircraft can be performed via a communications bus, such as, for example, an Aeronautical Radio, Incorporated (ARINC) standard communications protocol. In an exemplary embodiment, aircraft communication with the aircraft can be performed via a communications bus, such as, for example, a Controller Area Network (CAN) bus.

User input devices 58, in some examples, are configured to receive input from a user. Examples of user input devices 58 can include a mouse, a keyboard, a microphone, a camera device, a presence-sensitive and/or touch-sensitive display, push buttons, arrow keys, or other type of device configured to receive input from a user. In some embodiments, input communication from the user can be performed via a communications bus, such as, for example, an Aeronautical Radio, Incorporated (ARINC) standard communications protocol. In an exemplary embodiment, user input communication from the user can be performed via a communications bus, such as, for example, a Controller Area Network (CAN) bus.

User output devices 60 can be configured to provide output to a user. Examples of user output devices 60 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines. In some embodiments, output communication to the user can be performed via a communications bus, such as, for example, an Aeronautical Radio, Incorporated (ARINC) standard communications protocol. In an exemplary embodiment, output communication to the user can be performed via a communications bus, such as, for example, a Controller Area Network (CAN) bus.

Discussion of Possible Embodiments

The following are non-exclusive descriptions of possible embodiments of the present invention.

Apparatus and associated methods relate to a system for determining a wavelength of a narrow-band light beam. The system includes a first photodetector having a first spectral response over a domain of wavelengths including the wavelength of the narrow-band light beam. The first photodetector is configured to generate a first output signal $i_{d1}$ indicative of a first photocurrent induced by a projection of a first portion of the narrow-band light beam thereon. The system includes a second photodetector having a second spectral response over the domain of wavelengths including the wavelength of the narrow-band light beam. The second spectral response is different from the first spectral response. The second photodetector is configured to generate a second output signal $i_{d2}$ indicative of a second photocurrent induced by a projection of a second portion of the narrow-band light beam thereon. The system also includes a calculation engine configured to determine a ratio of the first and second photocurrents. The determined ratio is a monotonic function of wavelength over the domain of wavelengths including the wavelength of the narrow-band light beam, thereby indicative of the wavelength of the narrow-band light beam.

The system of the preceding paragraph can optionally include, additionally and/or alternatively, any one or more of the following features, configurations and/or additional components:

A further embodiment of the foregoing system, wherein the first and second photodetectors can be arranged such that the second portion of the narrow-band beam is a portion of the narrow-band beam of light that transmits through the first photodetector.

A further embodiment of any of the foregoing systems can further include an optical system configured to project the first and second portions of the narrow-band light beam onto the first and second photodetectors, respectively.

A further embodiment of any of the foregoing systems, wherein the first and second photodetectors are adjacent to one another, and wherein the optical system includes a beam splitter that splits the narrow-band light beam into the first and second portions.

A further embodiment of any of the foregoing systems can further include a third photodetector having the first spectral response over the domain of wavelengths including the wavelength of the narrow-band light beam. The third photodetector can be configured to generate a first reference output signal, $i_{r1}$ indicative of a first dark current of the third photodetector.

A further embodiment of any of the foregoing systems can further include a fourth photodetector having the second spectral response over the domain of wavelengths including the wavelength of the narrow-band light beam. The fourth photodetector can be configured to generate a second reference output signal, $i_{r2}$ indicative of a second dark current of the fourth photodetector.

A further embodiment of any of the foregoing systems, wherein the first photocurrent is equal to a first difference between the first output signal and the first reference signal $(i_{d1}-i_{r1})$ and the second photocurrent is equal to a second difference between the second output signal and the second reference signal $(i_{d2}-i_{r2})$.

A further embodiment of any of the foregoing systems, wherein the ratio is given by:

$$\frac{(i_{d1}-i_{r1})-(i_{d2}-i_{r2})}{(i_{d1}-i_{r1})+(i_{d2}-i_{r2})}.$$

A further embodiment of any of the foregoing systems can further include an optical system configured to project the first and second portions of the narrow-band light beam onto the first and second photodetectors, respectively. The optical system can be configured to obscure the third and fourth photodetectors from projection of the narrow-band light beam thereon, so that the first and second reference output signals are indicative of a first and second dark current, respectively.

A further embodiment of any of the foregoing systems can further include an optical sensor configured to generate the narrow-band light beam, wherein the wavelength of the narrow-band light beam is indicative of a sensed parameter.

A further embodiment of any of the foregoing systems, wherein optical sensor includes a diffraction grating having a spacing that is a function of a linear dimension.

A further embodiment of any of the foregoing systems, wherein the optical sensor is a fiber Bragg grating.

Some embodiments relate to a method for determining the wavelength of a narrow-band light beam. The method includes projecting a first portion of a narrow-band light beam onto a first photodetector having a first spectral response over a domain of wavelengths including the wavelength of the narrow-band light beam. The method includes generating, in response to the projection of a first portion of the narrow-band light beam thereon, a first output signal $i_{d1}$ indicative of a first photocurrent induced by the projection of the first portion of the narrow-band light beam thereon. The method includes projecting a second portion of a narrow-band light beam onto a second photodetector having a second spectral response over the domain of wavelengths including the wavelength of the narrow-band light beam, the second spectral response different from the first spectral response. The method includes generating, in response to projection of a second portion of the narrow-band light beam thereon, a second output signal $i_{d2}$ indicative of a second photocurrent induced by the projection of the second portion of the narrow-band light beam thereon. The method also includes determining a ratio of the first and second photocurrents, wherein the determined ratio is a monotonic function of wavelength over the domain of wavelengths including the wavelength of the narrow-band light beam, thereby indicative of the wavelength of the narrow-band light beam.

The method of the preceding paragraph can optionally include, additionally and/or alternatively, any one or more of the following features, configurations and/or additional components:

A further embodiment of the foregoing method, wherein projecting the second portion of the narrow-band beam onto the second photodetector can include transmitting the second portion of the narrow-band beam of light through the first photodetector.

A further embodiment of any of the foregoing methods can further include beam splitting the narrow-band light beam into the first and second portions.

A further embodiment of any of the foregoing methods can further include obscuring the narrow-band light beam from a third photodetector having the first spectral response over a domain of wavelengths including the wavelength of the narrow-band light beam.

A further embodiment of any of the foregoing methods can further include generating a first reference signal $i_{r1}$ indicative of a first dark current of the third photodetector.

A further embodiment of any of the foregoing methods can further obscuring the narrow-band light beam from a fourth photodetector having the second spectral response over a domain of wavelengths including the wavelength of the narrow-band light beam.

A further embodiment of any of the foregoing methods can further include generating a second reference signal $i_{r2}$ indicative of a second dark current of the fourth photodetector.

A further embodiment of any of the foregoing methods, wherein the first photocurrent is equal to a first difference between the first output signal and the first reference signal ($i_{d1}-i_{r1}$), and the second photocurrent is equal to a second difference between the second output signal and the second reference signal ($i_{d2}-i_{r2}$).

A further embodiment of any of the foregoing methods, wherein the ratio is given by:

$$\frac{(i_{d1}-i_{r1})-(i_{d2}-i_{r2})}{(i_{d1}-i_{r1})+(i_{d2}-i_{r2})}.$$

A further embodiment of any of the foregoing methods can further include generating, via an optical sensor, the narrow-band light beam, wherein the wavelength of the narrow-band light beam is indicative of a sensed parameter.

A further embodiment of any of the foregoing methods, wherein optical sensor includes a diffraction grating having a spacing that is a function of a linear dimension.

A further embodiment of any of the foregoing methods, wherein the optical sensor is a fiber Bragg grating.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for determining a wavelength of a narrow-band light beam, the system comprising:
a first photodetector having a first spectral response over a domain of wavelengths including the wavelength of the narrow-band light beam, the first photodetector configured to generate a first output signal $i_{d1}$ indicative of a first photocurrent induced by a projection of a first portion of the narrow-band light beam thereon, wherein the first spectral response is monotonically increasing throughout the domain of wavelengths including the wavelength of the narrow-band light beam;
a second photodetector having a second spectral response over the domain of wavelengths including the wavelength of the narrow-band light beam, the second spectral response different from the first spectral response, the second photodetector configured to generate a second output signal $i_{d2}$ indicative of a second photocurrent induced by a projection of a second portion of the narrow-band light beam thereon, wherein the second spectral response is monotonically decreasing throughout the domain of wavelengths including the wavelength of the narrow-band light beam; and
a calculation engine configured to determine a ratio of the first and second photocurrents, wherein the determined ratio is a monotonic function of wavelength over the domain of wavelengths including the wavelength of the narrow-band light beam, thereby indicative of the wavelength of the narrow-band light beam.

2. The system of claim 1, wherein the first and second photodetectors are arranged such that the second portion of the narrow-band beam is a portion of the narrow-band beam of light that transmits through the first photodetector.

3. The system of claim 1, further comprising:
an optical system configured to project the first and second portions of the narrow-band light beam onto the first and second photodetectors, respectively.

4. The system of claim 3, wherein the first and second photodetectors are adjacent to one another, and wherein the optical system includes a beam splitter that splits the narrow-band light beam into the first and second portions.

5. The system of claim 1, further comprising:
a third photodetector having the first spectral response over the domain of wavelengths including the wavelength of the narrow-band light beam, the third photodetector configured to generate a first reference output signal, $i_{r1}$ indicative of a first dark current of the third photodetector; and
a fourth photodetector having the second spectral response over the domain of wavelengths including the wavelength of the narrow-band light beam, the fourth photodetector configured to generate a second reference output signal, $i_{r2}$ indicative of a second dark current of the fourth photodetector.

6. The system of claim 5, wherein the first photocurrent is equal to a first difference between the first output signal and the first reference signal ($i_{d1}-i_{r1}$), and the second photocurrent is equal to a second difference between the second output signal and the second reference signal ($i_{d2}-i_{r2}$).

7. The system of claim 6, wherein the ratio is given by:

$$\frac{(i_{d1} - i_{r1}) - (i_{d2} - i_{r2})}{(i_{d1} - i_{r1}) + (i_{d2} - i_{r2})}.$$

8. The system of claim 7, further comprising:
an optical system configured to project the first and second portions of the narrow-band light beam onto the first and second photodetectors, respectively, and configured to obscure the third and fourth photodetectors from projection of the narrow-band light beam thereon, so that the first and second reference output signals are indicative of a first and second dark current, respectively.

9. The system of claim 1, further comprising:
an optical sensor configured to generate the narrow-band light beam, wherein the wavelength of the narrow-band light beam is indicative of a sensed parameter.

10. The system of claim 9, wherein the optical sensor includes a diffraction grating having a spacing that is a function of a linear dimension.

11. The system of claim 9, wherein the optical sensor is a fiber Bragg grating.

12. A method for determining a wavelength of a narrow-band light beam, the method comprising:
projecting a first portion of a narrow-band light beam onto a first photodetector having a first spectral response over a domain of wavelengths including the wavelength of the narrow-band light beam, wherein the first spectral response is monotonically increasing throughout the domain of wavelengths including the wavelength of the narrow-band light beam;
generating, in response to the projection of a first portion of the narrow-band light beam thereon, a first output signal $i_{d1}$ indicative of a first photocurrent induced by the projection of the first portion of the narrow-band light beam thereon;
projecting a second portion of a narrow-band light beam onto a second photodetector having a second spectral response over the domain of wavelengths including the wavelength of the narrow-band light beam, the second spectral response different from the first spectral response, wherein the second spectral response is monotonically decreasing throughout the domain of wavelengths including the wavelength of the narrow-band light beam;
generating, in response to projection of a second portion of the narrow-band light beam thereon, a second output signal $i_{d2}$ indicative of a second photocurrent induced by the projection of the second portion of the narrow-band light beam thereon; and
determining a ratio of the first and second photocurrents, wherein the determined ratio is a monotonic function of wavelength over the domain of wavelengths including the wavelength of the narrow-band light beam, thereby indicative of the wavelength of the narrow-band light beam.

13. The method of claim 12, wherein projecting the second portion of the narrow-band beam onto the second photodetector comprises:
transmitting the second portion of the narrow-band beam of light through the first photodetector.

14. The method of claim 12, further comprising:
beam splitting the narrow-band light beam into the first and second portions.

15. The method of claim 12, further comprising:
obscuring the narrow-band light beam from a third photodetector having the first spectral response over a domain of wavelengths including the wavelength of the narrow-band light beam;
generating a first reference signal $i_{r1}$ indicative of a first dark current of the third photodetector;
obscuring the narrow-band light beam from a fourth photodetector having the second spectral response over a domain of wavelengths including the wavelength of the narrow-band light beam; and
generating a second reference signal $i_{r2}$ indicative of a second dark current of the fourth photodetector.

16. The method of claim 15, wherein the first photocurrent is equal to a first difference between the first output signal and the first reference signal ($i_{d1}-i_{r1}$), and the second photocurrent is equal to a second difference between the second output signal and the second reference signal ($i_{d2}-i_{r2}$).

17. The method of claim 16, wherein the ratio is:

$$\frac{(i_{d1} - i_{r1}) - (i_{d2} - i_{r2})}{(i_{d1} - i_{r1}) + (i_{d2} - i_{r2})}.$$

18. The method of claim 12, further comprising:
generating, via an optical sensor, the narrow-band light beam, wherein the wavelength of the narrow-band light beam is indicative of a sensed parameter.

19. The method of claim 18, wherein the optical sensor includes a diffraction grating having a spacing that is a function of a linear dimension.

20. The method of claim 18, wherein the optical sensor is a fiber Bragg grating.

* * * * *

UNITED STATES PATENT AND TRADEMARK OFFICE
CERTIFICATE OF CORRECTION

PATENT NO.       : 10,281,329 B2
APPLICATION NO.  : 15/623137
DATED            : May 7, 2019
INVENTOR(S)      : David H. Crowne It is certified that error appears in the above-identified patent and that said Letters Patent is hereby corrected as shown below:

In the Claims

Column 14, Line 5 Claim 12:
Delete "monotonic ally"
Insert -- monotonically --

Signed and Sealed this
Sixteenth Day of July, 2019

Andrei Iancu
*Director of the United States Patent and Trademark Office*